US008896688B2

(12) United States Patent
Blanton et al.

(10) Patent No.: US 8,896,688 B2
(45) Date of Patent: Nov. 25, 2014

(54) DETERMINING POSITION IN A PROJECTION CAPTURE SYSTEM

(75) Inventors: Robert D Blanton, San Diego, CA (US);
Otto K Sievert, Oceanside, CA (US);
Hamadi Jamali, Escondido, CA (US);
David Bradley Short, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 13/289,673

(22) Filed: Nov. 4, 2011

(65) Prior Publication Data
US 2013/0113920 A1  May 9, 2013

(51) Int. Cl.
*H04N 7/18* (2006.01)
*H04N 9/47* (2006.01)
*G09G 5/00* (2006.01)
*G06K 9/00* (2006.01)
*G06F 3/042* (2006.01)

(52) U.S. Cl.
CPC ............... *G06F 3/0426* (2013.01); *G06K 9/00* (2013.01); *G06F 3/0425* (2013.01)
USPC ............................ 348/135; 345/156; 382/181

(58) Field of Classification Search
None
See application file for complete search history.

(56) References Cited

U.S. PATENT DOCUMENTS

| | | | |
|---|---|---|---|
| 6,144,453 A * | 11/2000 | Hallerman et al. ........... 356/616 |
| 7,023,536 B2 | 4/2006 | Zhang et al. | |
| 7,038,846 B2 | 5/2006 | Mandella et al. | |
| 7,088,440 B2 | 8/2006 | Buermann et al. | |
| 7,092,106 B2 * | 8/2006 | Cox et al. ...................... 356/602 |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl et al. | |
| 7,268,956 B2 | 9/2007 | Mandella et al. | |
| 7,474,809 B2 | 1/2009 | Carl et al. | |
| 7,530,019 B2 | 5/2009 | Kjeldsen et al. | |
| 7,626,578 B2 | 12/2009 | Wilson et al. | |
| 7,692,625 B2 | 4/2010 | Morrison et al. | |
| 7,729,515 B2 | 6/2010 | Mandella et al. | |

(Continued)

FOREIGN PATENT DOCUMENTS

WO   WO-2007043036   4/2007

OTHER PUBLICATIONS

Gao, Rui et al; Microsoft Research-Mobile Surface; Microsoft Research 2010; http://research.microsoft.com/en-us/projects/mobilesurface/.

(Continued)

*Primary Examiner* — Joseph Ustaris
*Assistant Examiner* — Kevin McInnish
(74) *Attorney, Agent, or Firm* — Steven Ormiston

(57) ABSTRACT

In one example, a projection capture system includes: a visible light projector to project a pattern on to a surface of a GUI control object placed on or above a work surface; a visible light camera to capture an image of the pattern projected on to the surface of the control object; and a controller operatively connected to the projector and the camera. Programming on the controller determines (1) a lateral position of the pattern relative to a reference position associated with the work surface based on the pattern image captured by the camera and (2) a height of the pattern above the work surface based on the lateral position of the pattern.

12 Claims, 9 Drawing Sheets

(56) References Cited

U.S. PATENT DOCUMENTS

| | | | |
|---|---|---|---|
| 7,826,641 | B2 | 11/2010 | Mandella et al. |
| 7,874,681 | B2 | 1/2011 | Huebner |
| 7,961,909 | B2 | 6/2011 | Mandella et al. |
| 2005/0162381 | A1* | 7/2005 | Bell et al. .............. 345/156 |
| 2005/0168437 | A1 | 8/2005 | Carl et al. |
| 2009/0116742 | A1* | 5/2009 | Nishihara ............... 382/173 |
| 2010/0007896 | A1* | 1/2010 | Fishbaine ............... 356/603 |
| 2010/0157254 | A1* | 6/2010 | Ishii ........................ 353/69 |
| 2011/0063256 | A1 | 3/2011 | Ye et al. |
| 2011/0227915 | A1 | 9/2011 | Mandella et al. |
| 2012/0038549 | A1 | 2/2012 | Mandella et al. |
| 2013/0194418 | A1 | 8/2013 | Gonzalez-Banos et al. |

OTHER PUBLICATIONS

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen + Touch =New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Junuzovic, Sasa et al; Microsoft Research—Illumi-Share; Microsoft Research; 2012; http://delivery.acm.org/10.1145/2210000/2208333/p1919-junuzovic.pdf?ip=15.219.153.76&id=2208333&acc=ACTIVE%20SERVICE&key=C2716FEBFA981EF1
53FE223D54A46A411F9E1F05F1DAF38&CFID=271558808&
CFTOKEN=96334302&_acm_=1387226323_
00af7aa5e159c7c67d724c49ef01bacf.

Kane, Shaun K. et al; Bonfire: A Nomadic System for Hybrid Laptop—Tabletop Interaction; UIST'09; Oct. 4, 2009; Victoria, British Columbia, Canada; http://dub.washington.edu/djangosite/media/papers/uist09.pdf.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

Melanson, Donald; Wiimote Repurposed For Multi-Point Interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions On, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using a Depth Camera as a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

* cited by examiner

DETERMINING POSITION IN A PROJECTION CAPTURE SYSTEM

BACKGROUND

A new projection capture device has been developed to help improve the interactive user experience working with real objects and projected objects on a physical work surface. Examples of the new device are described in International Patent Applications PCT/US2011/046253 titled PROJECTION CAPTURE SYSTEM AND METHOD filed 2 Aug. 2011 and PCT/US2011/053947 titled PORTABLE PROJECTION CAPTURE DEVICE filed 29 Sep. 2011. In one implementation of the new projection capture device, a GUI (graphical user interface) is projected on to a work surface. To properly interpret touch-like user control actions in the projected GUI, it is desirable to detect when a user's finger or other control object is in close proximity to the work surface.

DRAWINGS

FIG. 1 is a perspective, exterior view illustrating one example of a new projection capture device and an interactive workspace associated with the device.

FIGS. 2 and 3 are perspective views illustrating one example of a projection capture device, such as the one shown in FIG. 1, with the exterior housing removed. FIG. 2 shows the light path for the projector. FIG. 3 shows the light path for the camera.

The same part numbers designate the same or similar parts throughout the figures.

DESCRIPTION

The examples shown in the figures and described below illustrate but do not limit the invention, which is defined in the Claims following this Description.

Figure 1:
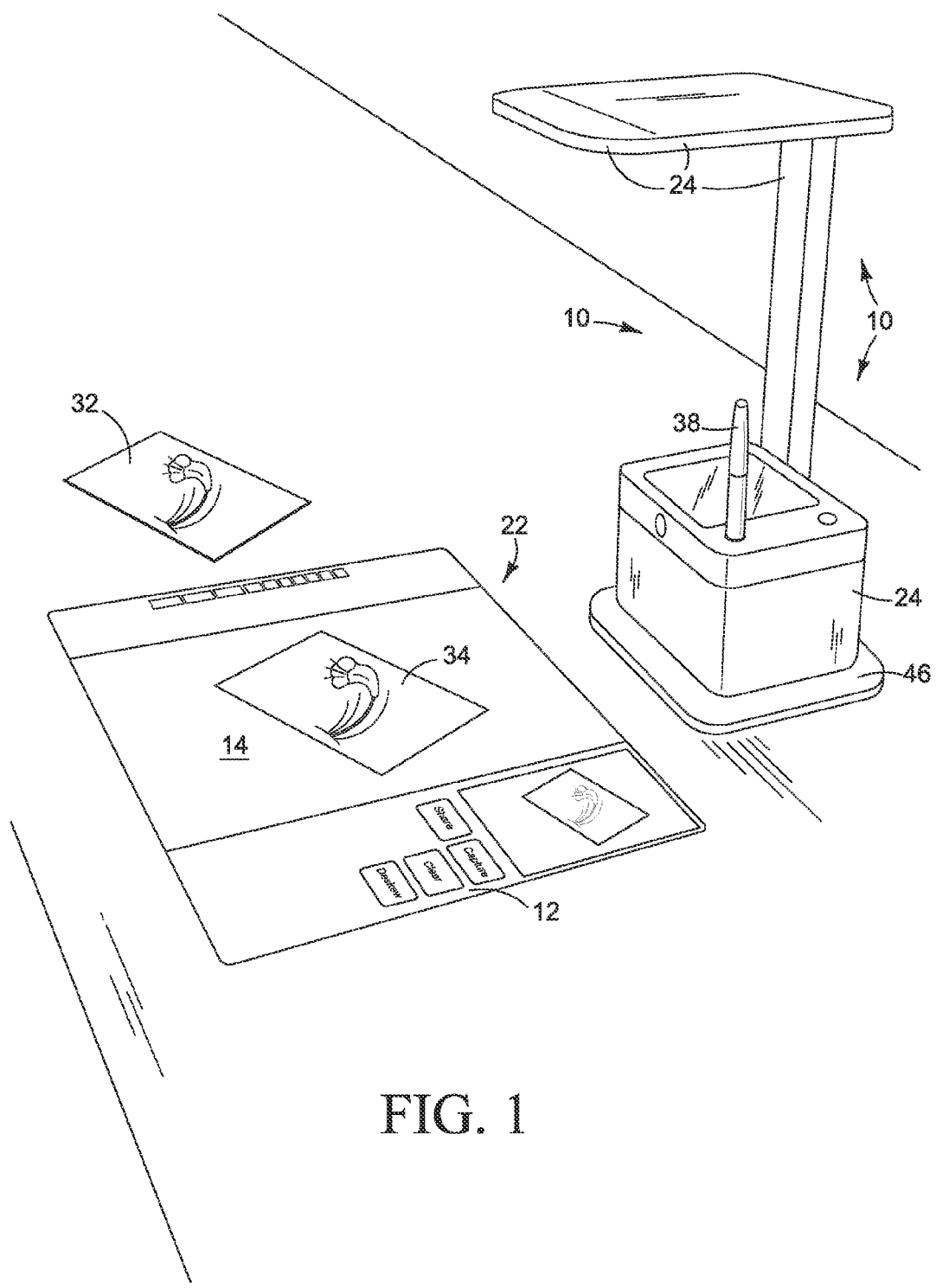
Figure 2:
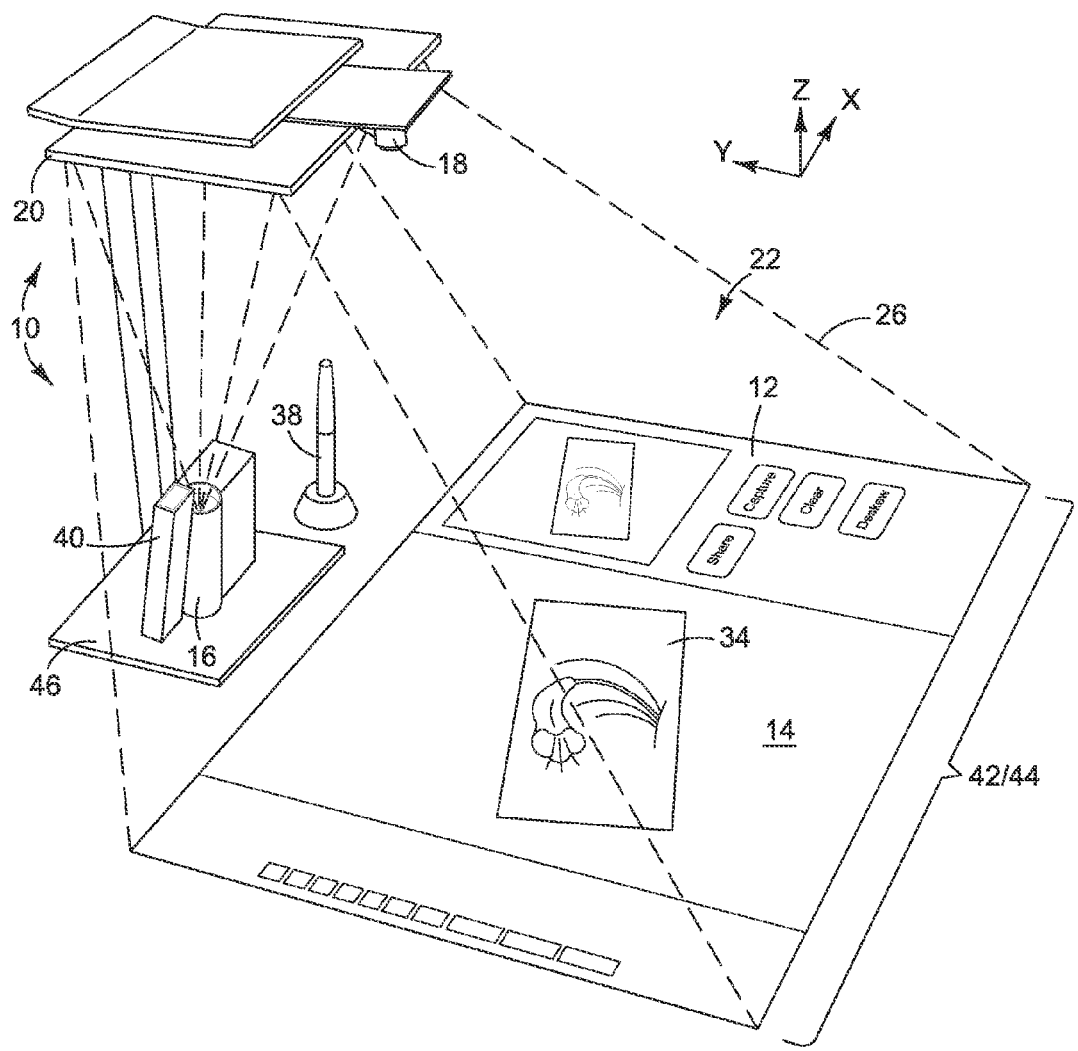

FIGS. 1-6 illustrate one example of a new projection capture device 10 in which a GUI (graphical user interface) 12 is projected on to a work surface 14. As best seen in FIG. 2, a visible light projector 16 projects GUI 12 and other images on to work surface 14. A visible light camera 18 captures images of real objects and projected images on work surface 12. (As described in more detail below, a fold mirror 20 is used to simulate a projector position above camera 18.) To properly interpret touch-like user control actions in the projected GUI 12 using camera 18, it is desirable to detect when a user's finger or other control object is in close proximity to work surface 14. Where, as here, projector 16 and camera 18 have different lights paths, the change in an image projected on to an object above work surface 12 compared to the image projected on to work surface 12 may be used to determine the height of the object above work surface 12. The close proximity of projector 16 to work surface 14 in device 10 constrains the heights of interest for GUI control to a narrow range close to work surface 14, enabling the use of the same visible light projector 16 and visible light camera 18 for both mixed reality projection/capture and for control object height detection.

"Light" as used in this document means visible light. Thus, "visible light" and "light" are used synonymously in this document.

Figure 3:
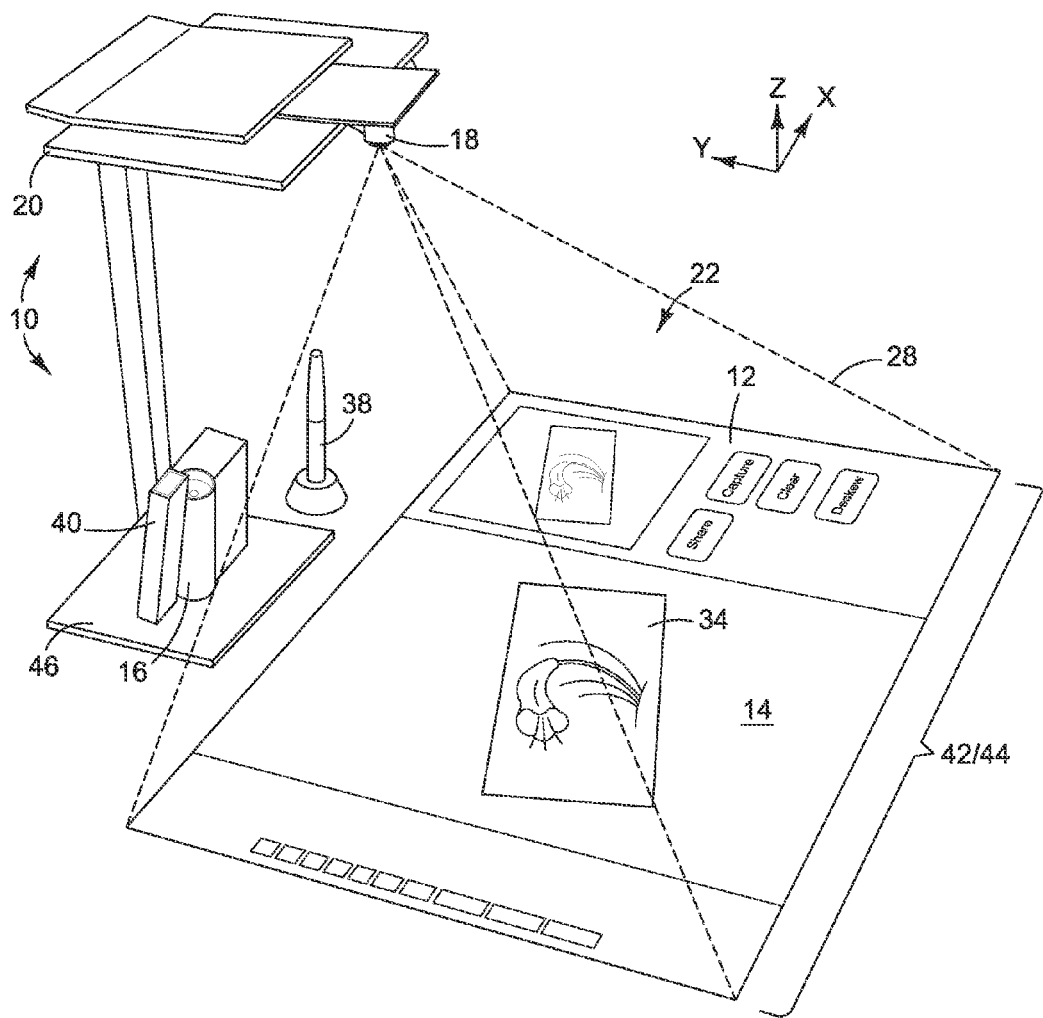
Figure 4:
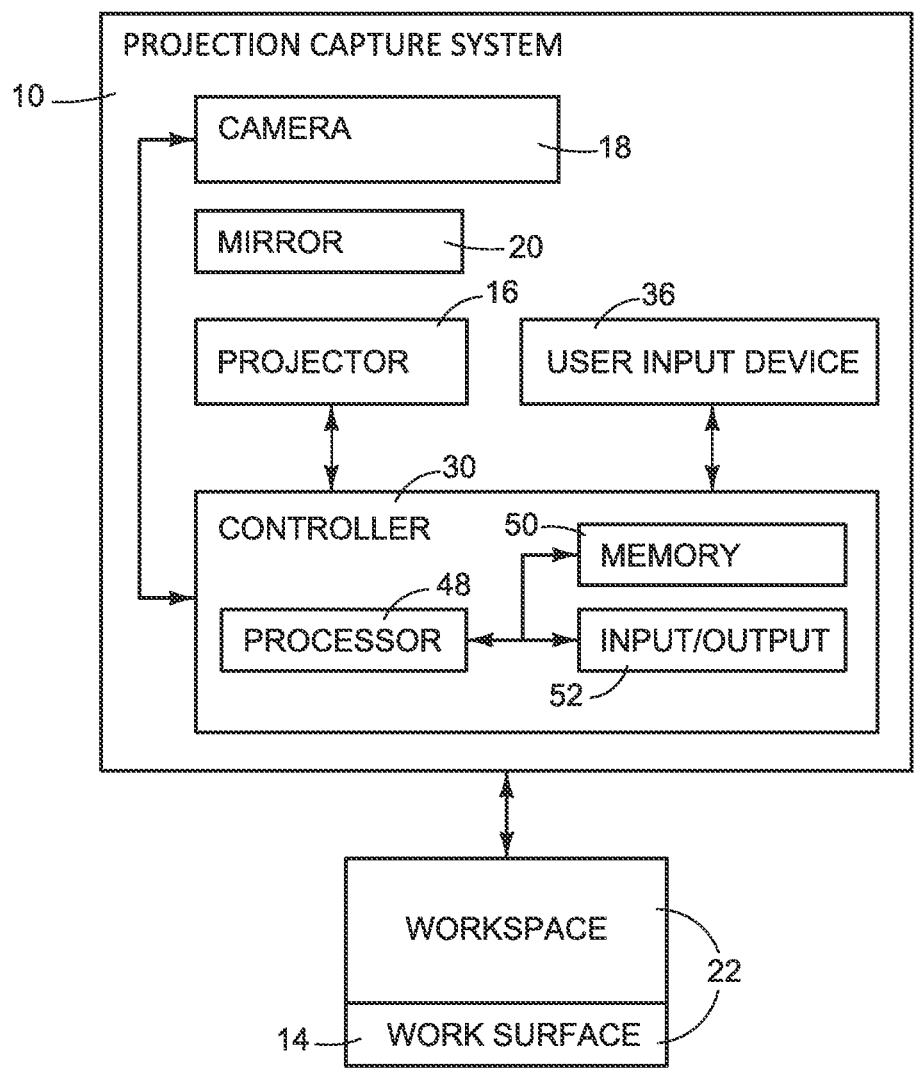
FIG. 4 is a block diagram of the projection capture device shown in FIGS. 2 and 3.
Figure 6:
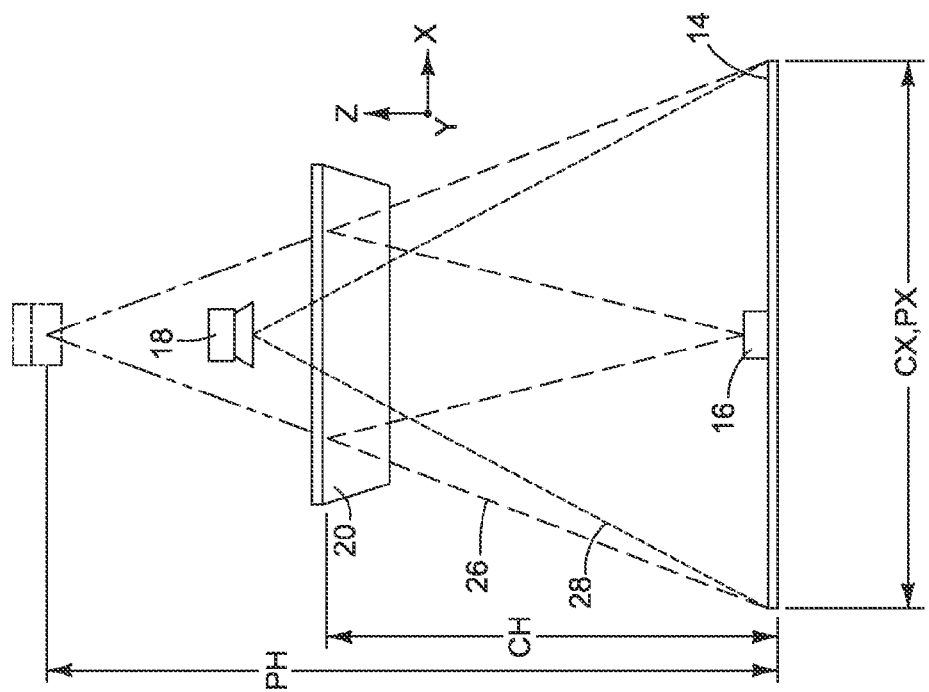
FIGS. 5 and 6 are side and front elevation views, respectively, showing the position of the projector and camera in the device of FIGS. 2 and 3.
Figure 5:
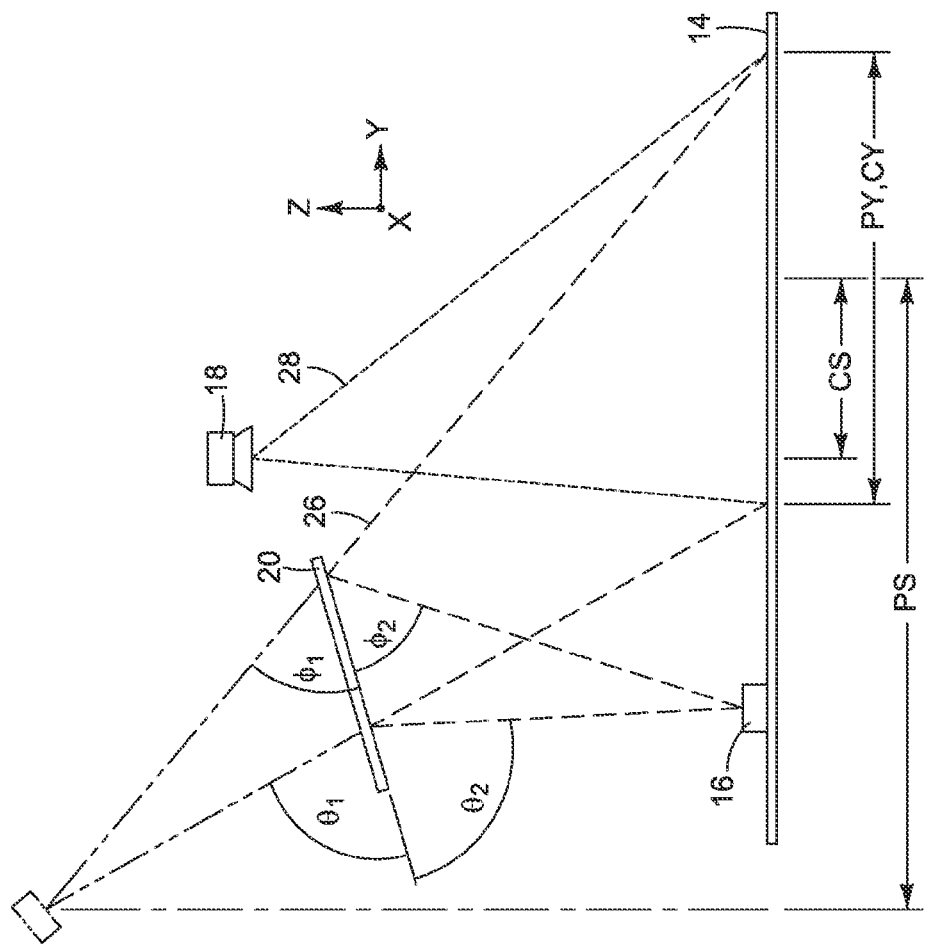

FIG. 1 is a perspective, exterior view illustrating one example of a new projection capture device 10 and an interactive workspace 22 associated with device 10. FIGS. 2 and 3 are perspective views illustrating one example of device 10 with part of the exterior housing 24 in FIG. 1 removed. FIG. 2 shows the light path 26 for projector 16. FIG. 3 shows the light path 28 for camera 18. FIG. 4 is a block diagram of device 10 shown in FIGS. 2 and 3. FIGS. 5 and 6 are side and front elevation views, respectively, showing the position of projector 16 and camera 18 and light paths 26, 28.

Referring to FIGS. 1-6, projection capture device 10 includes projector 16, camera 18, and a controller 30 (FIG. 4). Camera 18 and projector 16 are operatively connected to controller 30 for camera 18 capturing an image of an object 32 in workspace 22 and projector 16 projecting the object image 34 into workspace 22 and, in some examples, for camera 18 capturing an image of the projected object image 34. In the example shown in FIG. 1, a two dimensional object 32 (a hardcopy photograph) placed onto a work surface 14 in workspace 22 has been photographed by camera 18, object 32 removed to the side of workspace 22, and object image 34 projected onto work surface 14 where it can be photographed by camera 18 and otherwise manipulated by a user. Although a two dimensional object 22 is shown, a three dimensional object could also be a subject of capture and projection.

Device 10 may also include a discrete user input device 36 that allows the user to interact with device 10 independent of or in addition to using touch like control actions. Input device 36 may be implemented, for example, with an infrared digital stylus 38 and an infrared camera 40 for detecting stylus 38 in workspace 22. Object image 34 may be transmitted to other workspaces 22 on remote devices 10 (not shown) for collaborative user interaction, and, if desired, object image 34 may be photographed by camera 18 and re-projected into local and/or remote workspaces 22 for further user interaction. In the example of FIG. 1, work surface 14 is part of the desktop or other underlying support structure and GUI 12 is projected on to surface 14 by projector 16. In other examples, work surface 14 could be implemented as a portable mat that may include a projected GUI, a printed GUI and/or touch sensitive areas.

In one example implementation for device 10, projector 16 also serves as the light source for camera 18. Camera capture area 42 and projector display area 44 overlap on work surface 14. Thus, a substantial operating efficiency can be gained using projector 16 both for projecting images and for camera lighting. Projector light path 26 is positioned with respect to camera 18 to enable user display interaction with minimal shadow occlusion while avoiding specular glare that would otherwise blind camera 18. Camera 18 and projector 16 are shifted away from the center of capture and display areas 42, 44 and projector 16 is positioned low, near base 46, and a fold mirror 20 is introduced into the projector's light path to simulate a projector position higher above work surface 14 where fold angles $\Theta 1 = \Theta 2$ and $\phi 1 = \phi 2$ (FIG. 5). The simulated position of projector 16 and the corresponding light path above mirror 20 are shown in phantom lines in FIGS. 5 and 6.

Camera 18 is placed in front of mirror 20 over workspace 22 so that it does not block projector light path 26. Camera 18 is positioned off center in the Y direction (FIG. 5) as part of the overall geometry to help move the specular glare spot out of capture area 42 while maintaining an acceptable offset for both camera 18 and projector 16. Projector 16 is focused on mirror 20 so that light from projector 16 is reflected off mirror 20 into workspace 22. By moving projector 16 down low and introducing a fold mirror 20 into the projector light path, the glare spot is kept out of capture area 42 with an acceptable projector offset and device 10 is sufficiently narrow, short and stable (not top heavy) to support a commercially attractive product implementation.

Referring now specifically to the block diagram of FIG. 4, controller 18 includes a processor 48, a memory 50, and an input/output 52 housed together in device 40. Input/out 52 allows device 10 to receive information from and send information to an external device. While input/output 52 is shown in FIG. 3 as being part of controller 18, some or all of input/output 52 could be separate from controller 18. For the configuration of controller 18 shown in FIG. 4, the system programming to control and coordinate the functions of camera 18 and projector 16 may reside substantially on controller memory 50 for execution by processor 48, thus enabling a standalone device 10 and reducing the need for special programming of camera 18 and projector 16. Programming for controller 18 may be implemented in any suitable form of processor executable medium including one or more software modules, hardware modules, special-purpose hardware (e.g., application specific hardware, application specific integrated circuits (ASICs), embedded controllers, hardwired circuitry, etc.), or some combination of these. Also, while other configurations are possible, for example where controller 18 is formed in whole or in part using a computer or server external to device 10, a compact standalone appliance such as device 10 shown in FIG. 1 offers the user full functionality in an integrated, compact portable device.

Referring to FIGS. 5 and 6, projector light path 28 diverges from camera light path 28 in the Y direction above work surface 14. This divergence creates what is effectively a stereoscopic view in which a measurable shift between the projector and camera paths can be used to add a depth (Z) dimension to the composite view. In the example shown, projector light path 26 and camera light path 28 are substantially coextensive at work surface 14. The diverging light paths 26, 28 moving away from surface 14 shift an image projected on to a surface above work surface 14 laterally, in the Y direction, compared to the image projected on to work surface 14. As described in more detail below, this shift may be used to determine the height of an object above work surface 12, for example the proximity of a user's finger or other control object to GUI 12 controls on work surface 12.

The projector display area shifts laterally in the Y direction moving up from work surface 14 in the Z direction and shrinks in the XY plane. Accordingly, as the surface on which an image is projected moves up from work surface 14 in the Z direction, the position of the image in the XY plane shifts laterally in the Y direction, and the size of the image shrinks and the image resolution increases. The amount of shrinkage and the size of the shift vary as a function of the height of the display surface. Camera 18 can detect image shrinkage within camera light path 28 and, since camera light path 28 is offset from projector light path 26 in the Y direction, camera 18 can also detect image shift within camera light path 28. Thus, programming on controller 30 (or camera 18) can be used to determine the height of the display surface based on the amount of shift and/or shrink detected by camera 18.

Figure 8:
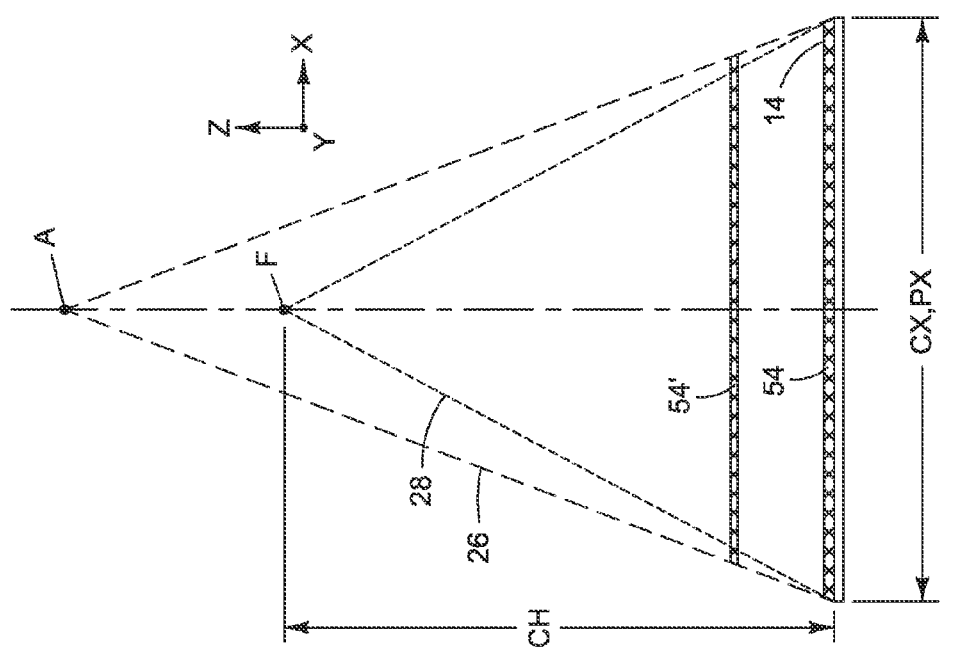
FIGS. 7 and 8 are side and front elevation views, respectively, showing the projector and camera light paths from FIGS. 5 and 6.
Figure 7:
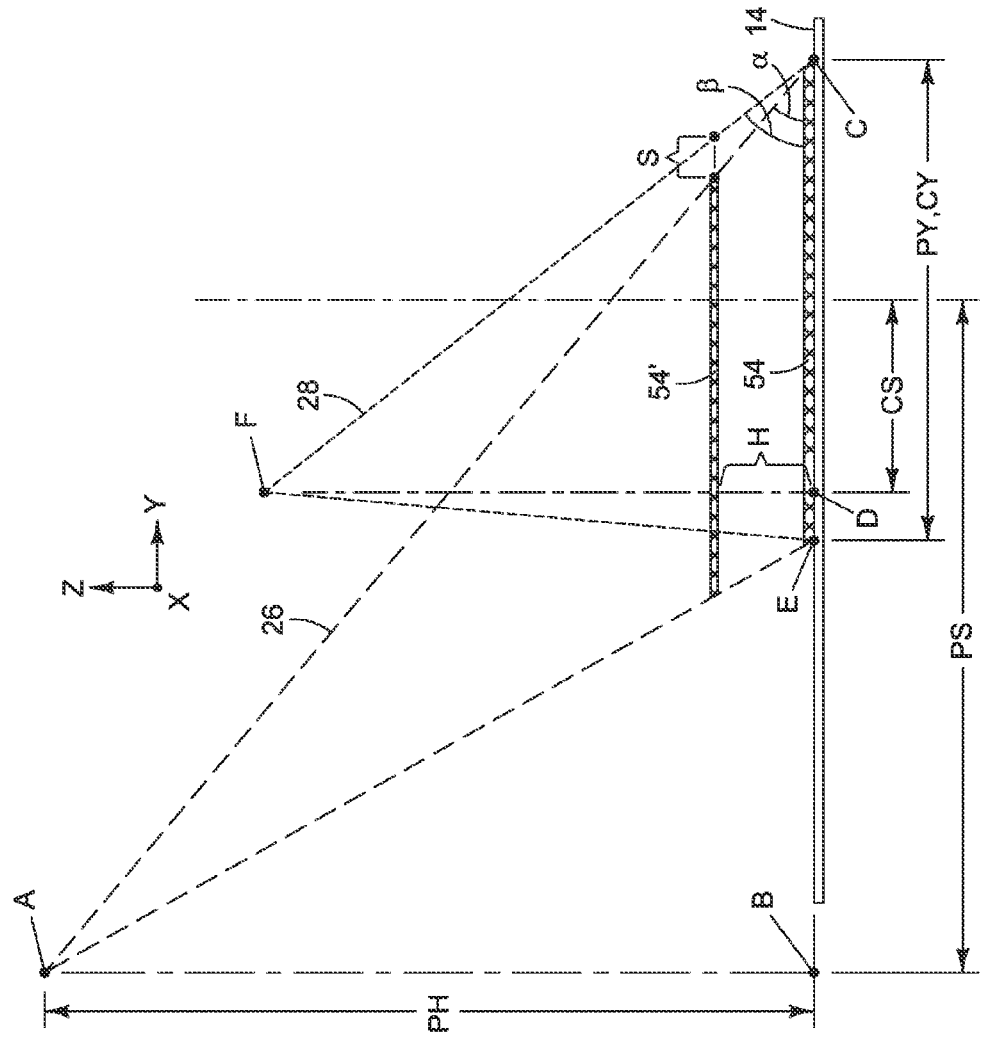
Figure 10:
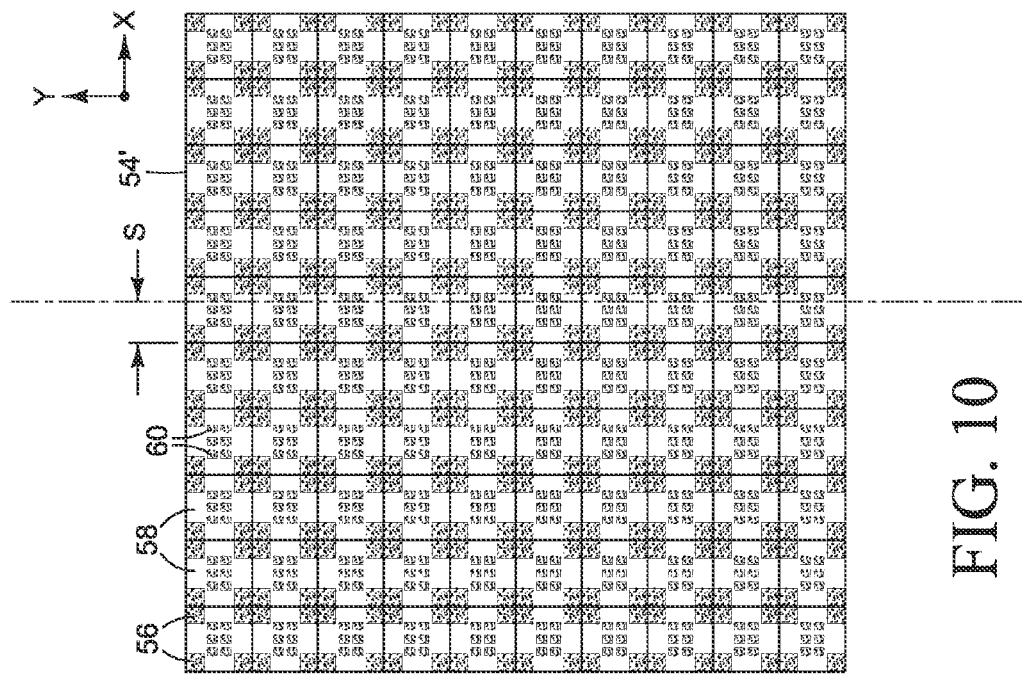
FIG. 10 is a plan view showing a shrunken, shifted test pattern at height H above the work surface.
Figure 9:
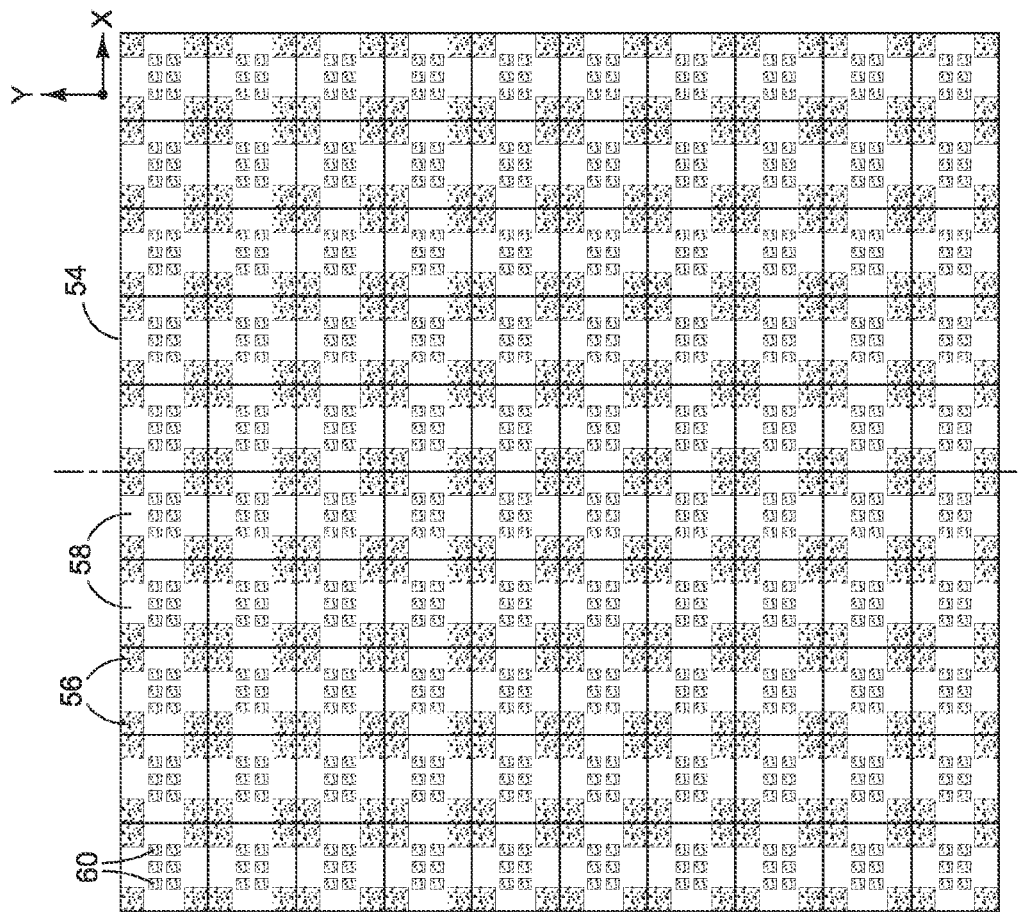
FIG. 9 is a plan view showing a test pattern at the device work surface.
Figure 11:
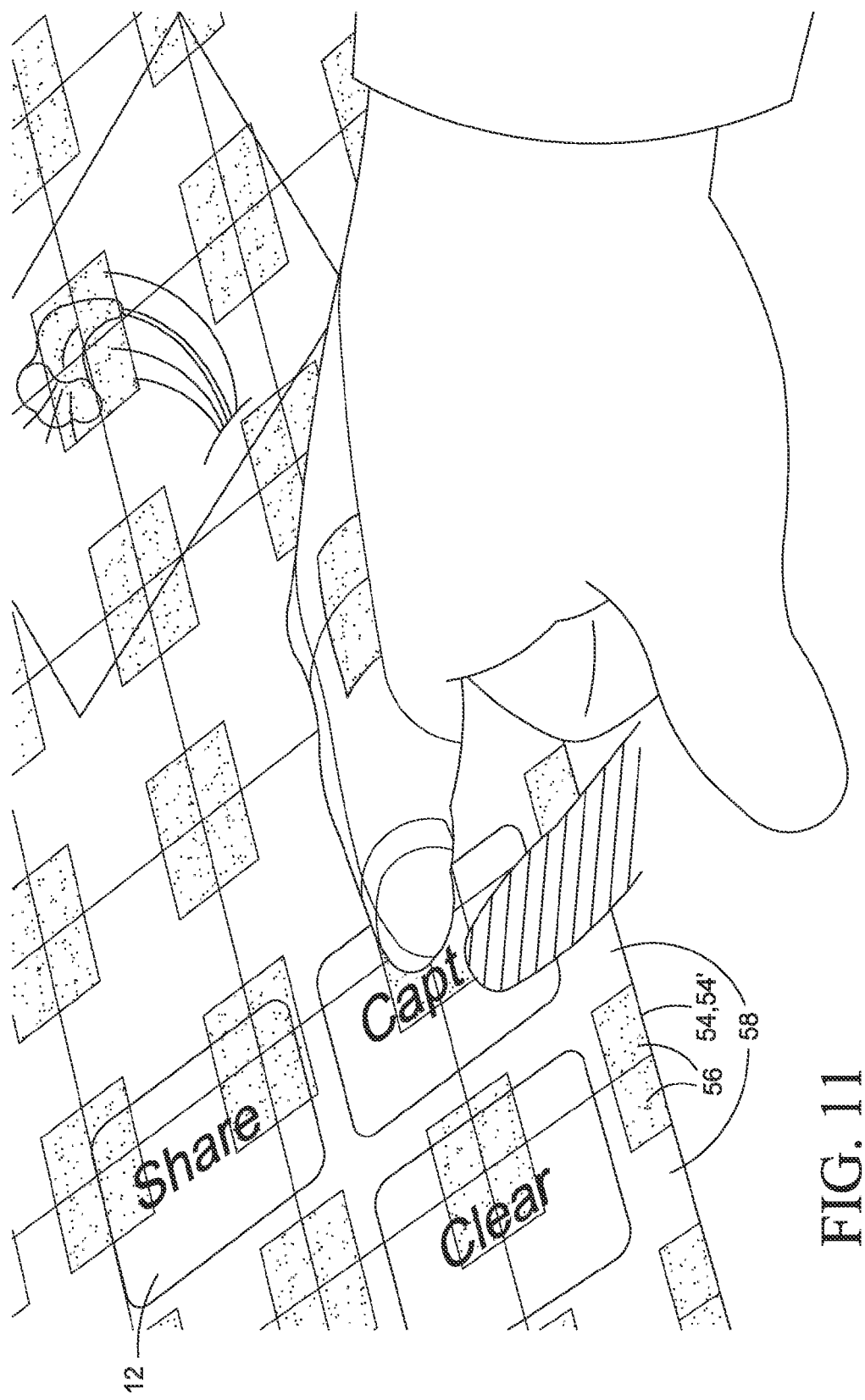
FIG. 11 shows a test pattern and a GUI projected simultaneously into the device work space with a user's finger over one of the GUI control icons.

FIGS. 7 and 8 are side and front elevation views, respectively, showing projector light path 26 and camera light path 28 with a test pattern 54 projected on to work surface 14 and on to a surface at a height H above surface 14. The projection of the test pattern at height H is designated by part number 54'. FIG. 9 is a plan view showing test pattern 54 at work surface 14. FIG. 10 is a plan view showing a shrunken, shifted test pattern 54' at height H above surface 14. FIG. 11 shows test pattern 54/54' and GUI 12 projected simultaneously into work space 22 and a user's finger over the GUI Capture icon. (Test pattern 54, 54' is shown as having depth in the Z direction in FIGS. 7 and 8 simply to make it easier to discern the test pattern in elevation views of FIGS. 7 and 8. Although a test pattern could be projected as a 3 dimensional image, i.e., with depth, it is expected that in most implementations test pattern 54, 54' will be projected in only two dimensions on to the target surface.)

Referring to FIG. 7, the height H of test pattern 54' above work surface 14 as a function of the lateral image shift S in the Y direction may be determined according to Equation 1.

$$H(S)=S \div (\tan \beta - \tan \alpha) \quad \text{Equation 1}$$

where:

S is image shift in the Y direction in camera light path 28;

β is an interior angle of triangle FDC as shown and tan β=CH/CD, where CH is the camera height above work surface 14 and CD is the length of the side of triangle FDC adjacent to angle β; and α is an interior angle of triangle ABC as shown and tan α=PH/CB where PH is the projector height above work surface 14 and CB is the length of the side of triangle ABC adjacent to angle α.

Height H may be computed by controller 30 according to the algorithm of Equation 1 for each instance in which H must be determined. Alternatively, the relevant solutions to Equation 1 for a predetermined device configuration may be represented in a look-up table in which the entries in each column (or row) represent a lateral shift S of pattern 54 and the corresponding row (or column) represents the height H.

Test pattern 54 may include an image or pattern of images uniquely identifiable within a maximum possible lateral shift for a predetermined range of heights above work surface 14. For GUI control objects, the heights of interest will be quite close to work surface 14. A pattern that may be uniquely identified within a range of heights close to surface 14 helps enable controller 30 (or camera 18) to detect the lateral shift directly from the pattern image captured by camera 18. It is expected that a test pattern 54 uniquely identifiable within a surface area of about 5 mm$^2$ should be adequate for detecting the lateral position of a user's finger or other GUI control object. In one example configuration for a desktop device 10 shown in Table 1 below, the effective projector height PH is 670 mm, the projector shift PS is 330 mm, the camera height CH is 450 mm, and the camera shift CS is 150 mm. For this configuration of device 10, the maximum shift S corresponding to a range of heights of interest close to work surface 14 is about 10% of the Y extent PY of projector light path 26 at work surface 14. Accordingly, a pattern 54 that is uniquely identifiable within 10% of the Y extent of projector light path 26 at work surface 14, a 32 mm×32 mm area for example, should be adequate for the heights of interest. In one example for a test pattern 54 shown in FIGS. 9-11, larger spots 56 at the corners of each grid box 58 are locators and the value of the pattern is encoded in smaller spots 60 at the interior of box 58. (Smaller spots 60 are omitted from pattern 54/54' in FIG. 11 for clarity.)

TABLE 1

| CAMERA | | | PROJECTOR | | |
|---|---|---|---|---|---|
| Sensor Mpixel | 12 Mp | PX | Illum Full-field X | 310 mm | |
| Sensor aspect ratio X/Y | 1.333 | PY | Illum Full-field Y | 310 mm | |
| Pixel size | .00175 mm | PH | Projector height | 670 mm | |
| CX Object full size X | 427 mm | PS | Projector shift in Y | 330 mm | |
| CY Object full size Y | 320 mm | | Lens offset | 216% | |
| CH Camera height | 450 mm | | Lens shift | 108% | |
| CS Camera shift in Y | 150 mm | | Max Y-fan angle | 35.76 deg | |
| Magnification⁻¹ | 66 | | Min Y-fan angle | 14.84 deg | |
| Sensor pixels X | 4016 | | Half-field X | 203.5 mm | |
| Sensor pixels Y | 3016 | | Half-field Y | 482.5 mm | |
| Sensor size X | 7.028 mm | | Throw ratio | 1.65 | |
| Sensor size Y | 5.278 mm | | Max throw angle | 38.01 deg | |
| Image size X | 6.470 mm | | | | |
| Image size Y | 4.848 mm | | | | |
| Half-field X | 213.5 mm | | | | |
| Half-field Y | 280 mm | | | | |
| Full-field angle | 76.08 deg | | | | |
| Sampling resolution | 220 ppi | CC | Camera clearance distance | 51.6 mm | |
| Capture length X | 464.85 mm | | | | |
| Capture length Y | 348.35 mm | GC | Glare spot clearance distance | 44.4 mm | |

In the examples described above, the height of a test pattern or other image projected on to a GUI control object is determined relative to a horizontal work surface 14. While it is expected that a projection capture device 10 usually will be implemented with a horizontal work surface 14, other orientations are possible. Thus, height H is just one example of a longitudinal position determined as a function of the lateral position of the projected pattern relative to a reference surface. Also, the new technique is not limited to GUI control objects but may be used to determine the longitudinal position of other objects.

Figure 12:
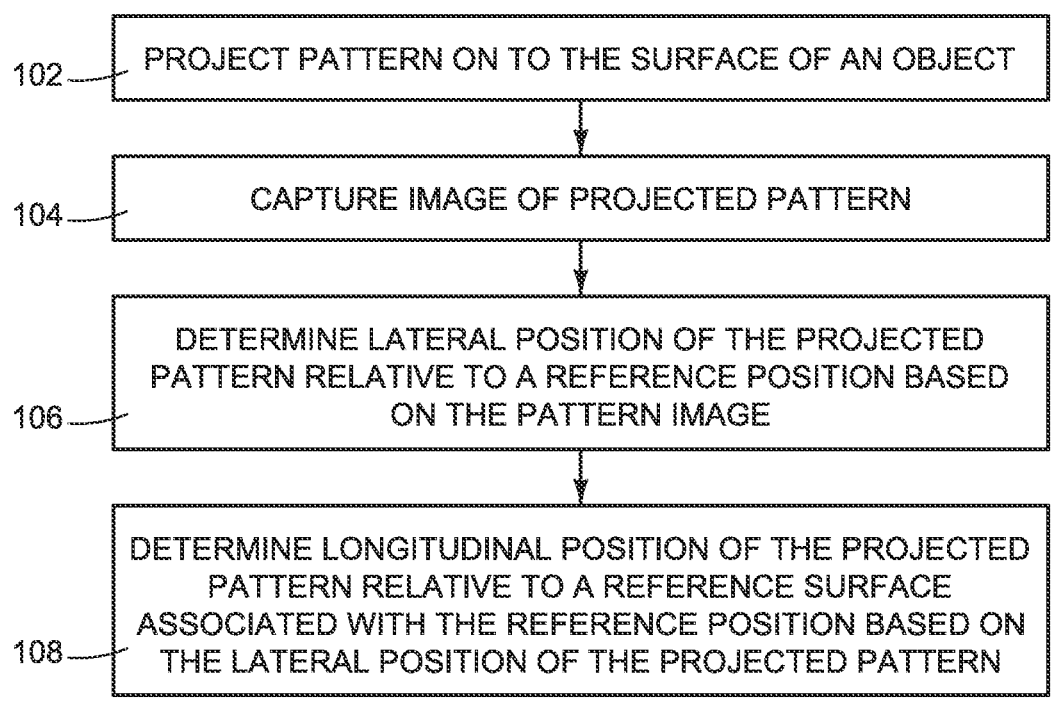
FIG. 12 is a flow chart illustrating one example of a method for determining the height or other longitudinal position of a test pattern relative to a reference surface.

In one example method shown in the flow chart of FIG. 12, a pattern is projected on to the surface of a GUI control or other object at block 102, for example using projector 16. An image of the projected pattern is captured at block 104, for example using camera 18. Then, at block 106, the lateral position of the projected pattern relative to a reference position is determined based on the pattern image captured at block 104, for example by processor 48 executing programming stored in controller memory 50. At block 106, the longitudinal position of the pattern relative to a reference surface associated with the reference position is determined based on the lateral position of the pattern determined at step 106, for example by processor 48 executing programming stored in controller memory 50.

As noted at the beginning of this Description, the examples shown in the figures and described above illustrate but do not limit the invention. Other examples are possible. Therefore, the foregoing description should not be construed to limit the scope of the invention, which is defined in the following claims.

What is claimed is:

1. A projection capture system for use with a horizontal work surface, comprising:

a single visible light projector to project a pattern on to a surface of a GUI control object placed on or above the work surface;

a single visible light camera positioned with respect to the projector such that a pattern projected into a camera light path shifts laterally within the camera light path as a function of the height of the pattern above the work surface, the camera to capture an image of the pattern projected on to the surface of the control object and detect a lateral shift in the pattern relative to a reference position associated with the work surface; and a controller operatively connected to the projector and the camera, the controller having programming thereon that when executed computes a height of the pattern above the work surface as a function of lateral shift detected by the camera according to the equation H(S)=S÷(tan β−tan α) where:

S is the lateral shift of the pattern in the camera light path;

β is an interior angle of a right triangle FDC in which FD is a height of the camera above the work surface and DC is a lateral distance along the work surface in a direction of camera shift between the camera and an edge of the pattern; and α is an interior angle of a right triangle ABC in which AB is an effective height of the projector and BC is a lateral distance along the work surface in a direction of projector shift between an effective position of the projector and the edge of the pattern.

2. The system of claim 1, wherein the pattern comprises an image uniquely identifiable within a maximum possible lateral pattern shift for a predetermined range of heights above the work surface.

3. The system of claim 2, wherein the projector, camera and controller are housed together as a single unit.

4. The system of claim 3, wherein, when the unit is deployed for use with the work surface:

the projector is positioned below the camera outside a volume bounded in two dimensions by a projector display area; and the camera is positioned over a camera capture area at a location offset from a center of the capture area.

5. The system of claim 4, wherein, when the unit is deployed for use with the work surface, the projector is configured to project light into the display area along a light path that is longer than a height of the camera above the work surface.

6. A non-transitory processor executable medium including programming thereon that when executed:

causes a projector to simultaneously project a GUI into a work space that includes a reference surface and a pattern on to a surface of a GUI control object placed on or above the reference surface;

causes a camera to capture an image of the pattern;

based on the pattern image, determines a lateral shift of the pattern relative to a reference position on the reference surface; and based on the lateral shift of the pattern, determines a height of the pattern above the reference surface according to the equation H(S)=S÷(tan β−tan α) where:

S is a lateral shift of the pattern in a camera light path;

β is an interior angle of a right triangle FDC in which FD is a height of the camera above the reference surface and DC is a lateral distance along the reference surface in a direction of camera shift between the camera and an edge of the pattern; and α is an interior angle of a right triangle ABC in which AB is an effective height of the projector and BC is a lateral distance along the reference surface in a direction of projector shift between an effective position of the projector and the edge of the pattern.

7. The medium of claim 6, wherein the reference position comprises a position of the pattern projected on to the reference surface.

8. The medium of claim 6, wherein the programming that causes a projector to project and a camera to capture comprises programming that when executed causes a single projector to project and a single camera to capture.

9. A method, comprising:
projecting a pattern on to a surface of an object;
capturing an image of the pattern with a camera;
based on the pattern image, determining a lateral shift of the pattern relative to a reference position; and
based on the lateral shift of the pattern, determining a height of the pattern above a reference surface associated with the reference position according to the equation $H(S)=S \div (\tan \beta - \tan \alpha)$ where:
S is a lateral shift of the pattern in a camera light path;
$\beta$ is an interior angle of a right triangle FDC in which FD is a height of the camera above the reference surface and DC is a lateral distance along the reference surface in a direction of camera shift between the camera and an edge of the pattern; and
$\alpha$ is an interior angle of a right triangle ABC in which AB is an effective height of the projector and BC is a lateral distance along the reference surface in a direction of projector shift between an effective position of the projector and the edge of the pattern.

10. The method of claim 9, further comprising projecting a GUI on to the reference surface simultaneously with projecting the pattern on to the surface of the object.

11. The method of claim 9, wherein the reference position comprises a position of the pattern projected on to the reference surface.

12. The method of claim 11, wherein:
projecting a pattern on to a surface of an object comprises projecting the pattern on to the surface of the object with only one projector; and
capturing an image of the pattern comprises capturing the image of the pattern with only one projector.

* * * * *